(12) United States Patent
Westerman et al.

(10) Patent No.: US 6,753,909 B1
(45) Date of Patent: Jun. 22, 2004

(54) CAMERA WITH SPATIALLY ADJUSTABLE VARIABLE DENSITY OPTICAL FILTER AND METHOD FOR CONTROLLING THE SAME

(75) Inventors: Larry Alan Westerman, Portland, OR (US); Jeffrey Norris Coleman, Wheaton, IL (US); Gary Alan Feather, Camas, WA (US); James M. Florence, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/295,272

(22) Filed: Apr. 20, 1999

(51) Int. Cl.⁷ .................. H04N 5/235; H04N 5/335; H04N 3/14; G02F 1/13; G02F 1/135; G02F 1/133
(52) U.S. Cl. .................. 348/229.1; 348/296; 348/297; 349/2; 349/25; 349/73
(58) Field of Search .................. 349/2, 25, 73; 348/229.1, 297, 296

(56) References Cited

U.S. PATENT DOCUMENTS

| | | | |
|---|---|---|---|
| 3,963,333 A | | 6/1976 | Mueller et al. .................. 352/72 |
| 3,978,497 A | | 8/1976 | Kondo .................. 354/43 |
| 4,358,186 A | | 11/1982 | Johnson et al. .................. 354/27 |
| 4,432,286 A | | 2/1984 | Witte .................. 110/193 |
| 4,603,356 A | * | 7/1986 | Bates .................. 348/367 |
| 4,645,300 A | | 2/1987 | Brandstetter et al. .. 350/162.12 |
| 4,978,986 A | | 12/1990 | Hatch .................. 354/295 |
| 5,030,985 A | * | 7/1991 | Bryant .................. 396/234 |
| 5,032,002 A | | 7/1991 | Fonneland et al. .... 350/162.12 |
| 5,040,877 A | | 8/1991 | Blinc et al. .................. 359/63 |
| 5,076,670 A | * | 12/1991 | Sayyah .................. 349/27 |
| 5,111,317 A | * | 5/1992 | Coulson .................. 349/37 |
| 5,144,422 A | | 9/1992 | Baker et al. .................. 358/109 |
| 5,227,886 A | * | 7/1993 | Efron et al. .................. 348/62 |
| 5,255,088 A | | 10/1993 | Thompson .................. 358/101 |
| 5,504,597 A | * | 4/1996 | Sprague et al. .................. 349/57 |
| 5,541,705 A | * | 7/1996 | Kan et al. .................. 396/233 |
| 5,550,656 A | * | 8/1996 | Sprague et al. .................. 349/5 |
| 5,729,305 A | * | 3/1998 | Robinson et al. .................. 349/2 |
| 5,751,352 A | * | 5/1998 | Ogawa .................. 348/364 |

* cited by examiner

*Primary Examiner*—Wendy R. Garber
*Assistant Examiner*—James M. Hannett
(74) *Attorney, Agent, or Firm*—Marger Johnson & McCollom, PC

(57) ABSTRACT

A camera is provided that includes an array of optical detectors and an optical filter placed adjacent the array. The optical detectors output detection signals that are used to form control signals. The filter includes spatial sections of individually adjustable optical density. The optical densities are controlled by the individual control signals. The camera outputs the combined control signals and detection signals, thus effectively providing an output with a larger dynamic range than would be provided by the detection signals of the detectors alone. An objective lens and a housing form a stand alone unit. The detectors can have different responses to different wavelengths to achieve color specific effects. Methods are further provided for controlling the filter. The detection signals are scanned to ensure that a predefined filtering condition is met. If not, control signals are iteratively generated and applied to the filter until the condition has been met. Then the detection signals are combined with the control signals to form composite signals that encode the intensity distribution of the beam. Control methods ensure greater dynamic range and accuracy. Image processing methods enhance viewability.

13 Claims, 4 Drawing Sheets

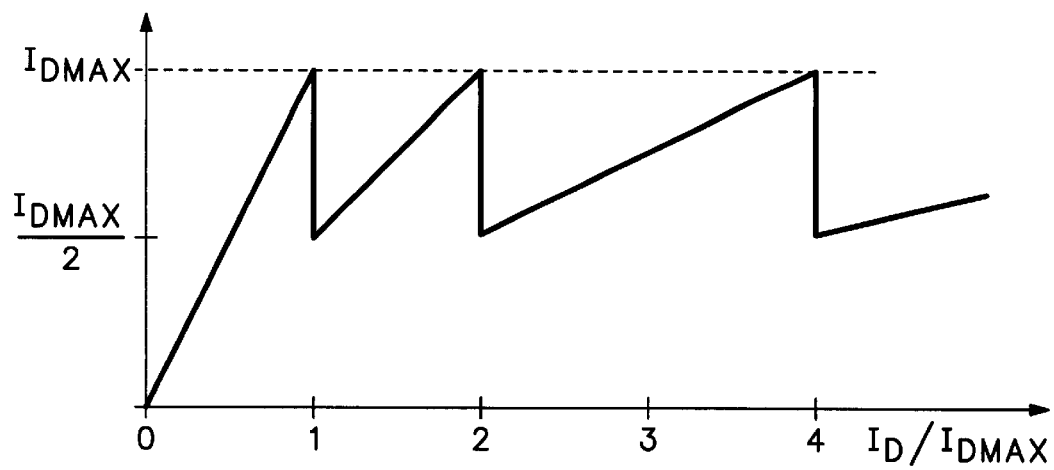
FIG.7
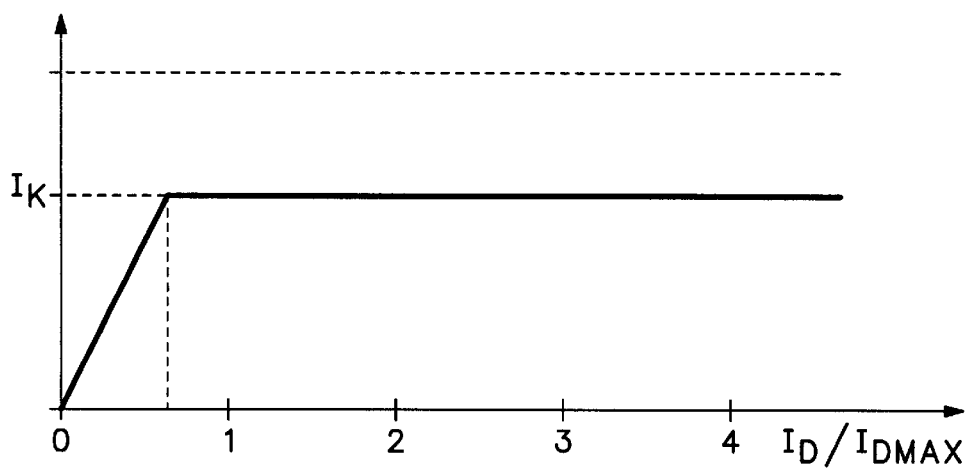
FIG.8
| 1 | 1 | 2 | 1 | 1 |
|---|---|---|---|---|
| 1 | 3 | 4 | 3 | 1 |
| 2 | 4 | 10 | 4 | 2 |
| 1 | 3 | 4 | 3 | 1 |
| 1 | 1 | 2 | 1 | 1 |
FIG.9

CAMERA WITH SPATIALLY ADJUSTABLE VARIABLE DENSITY OPTICAL FILTER AND METHOD FOR CONTROLLING THE SAME

BACKGROUND OF THE INVENTION

1. Field of the invention

The present invention is related to the field of cameras that include optical filters with spatially adjustable variable optical density.

2. Description of the related art

Cameras using detector arrays, such as CCD arrays at the focal plane suffer from the drawback that the dynamic range of the detectors is limited to a window of values of intensity. The window can be adjusted up or down. The adjustment is typically optimized by setting the window to match the average illumination level.

No matter where the intensity window is set, illumination with intensity outside the window will not be imaged correctly. Points of lesser illumination will appear as having a uniform minimum threshold value, losing all detail below that. Points of higher illumination will do the same with a maximum threshold value. In addition some of them may "spill over" to adjacent neighboring elements that are less illuminated, causing "blooming" or "smearing".

A solution is to use a spatially adjustable variable density light filter in conjunction with the camera. A specific application is taught in U.S. Pat. No. 5,541,705 to Kan et al., reproduced in this document as FIG. 1. A receiving camera 20 has an objective lens 22 and a CCD array 24 at the focal plane of the objective lens. The filter is made from a liquid crystal light valve (LCLV) 30, that is placed in the path of the beam with the image and between a polarizer 32 and an analyzer 34.

A main lens 40 and a relay lens 42 focus the image successively through the filter, a second LCLV 46, and then onto the camera. A scanner control 50 scans the scene, and accordingly provides a signal. The scanner signal goes to an optional brightness information recorder or transmitter 52. The scanner signal also goes to LCLV display driver 54, that drives both the LCLVs. Each LCLV is made from a two dimensional array of elements whose optical density is individually controllable. This way they can make local bright spots dimmer, bringing them within the window of values of the dynamic range.

A problem identified by the inventors in the design of such systems is that the LCLV itself ordinarily tends to cast an undesirable image on the CCD array itself. The prior art has avoided this problem by placing the LCLV at an effectively infinite optical distance from the CCD array. For example, in FIG. 1, LCLV 30 is at the focal plane of lens 40.

This solution has been unsatisfactory. Adding lenses 40 and 42 makes the optical path of the whole system longer, and adds to the cost.

It is desired to exploit the advantages of variable density filters without the cost of additional lenses, or requiring a longer optical path.

BRIEF SUMMARY OF THE INVENTION

The present invention overcomes these problems and limitations of the prior art.

The invention provides a camera that includes an array of optical detectors and an optical filter placed adjacent the array. This way the filter does not cast an objectionable image. This placing eliminates the need for using the additional lenses, and for dedicating the optical path length that they require.

The filter includes spatial sections of individually adjustable optical density. The optical densities are controlled by individual control signals. The optical detectors output detection signals that are used to form the control signals. The camera outputs the combined control signals and detection signals, thus effectively providing a larger dynamic range than would be provided by the detection signals of the detectors alone.

The camera is preferably provided with an objective lens that defines a focal plane. The detector array is placed at the focal plane. The camera can include a housing to form a stand alone unit, that does not need to be larger than an equivalent prior art camera.

The detectors can have different responses to different wavelengths. As such, color specific effects are attained.

The invention further provides a method for controlling the filter. The detection signals are scanned to ensure that a predefined filtering condition is met. If not, control signals are iteratively generated and applied to the filter until the condition has been met. Then the detection signals are combined with the control signals to form composite signals that encode the intensity distribution of the beam. Control methods ensure greater dynamic range and accuracy. Image processing methods enhance viewability.

The invention can be used advantageously in video cameras and still image cameras, such as those in digital copiers. Another advantage of the invention is that it permits the use of sensors with very low dynamic range.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 7 is a graph showing how incident intensities are mapped as a result of a first control method of the invention.

FIG. 8 is a graph showing how incident intensities are mapped as a result of a second control method of the invention.

FIG. 9 is a table showing numerical values of a kernel suitable for convolving a reconstructed profile of the intensities of a light beam according to the method of the invention.

DETAILED DESCRIPTION OF THE PREFERRED EMBODIMENT(S)

As has been mentioned, the present invention provides a camera that includes a detector array and a filter with spatial sections of individually adjustable optical density. The invention further provides methods for controlling the filter.

Figure 1:
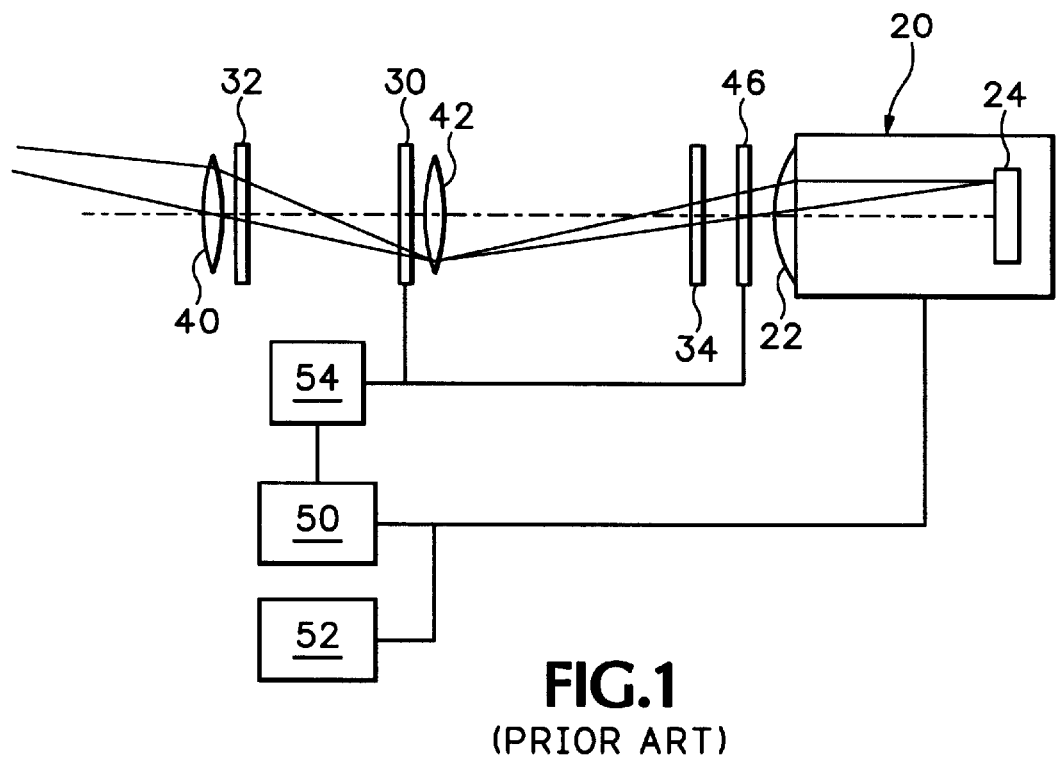
FIG. 1 is a diagram of a camera in the prior art.
Figure 2:
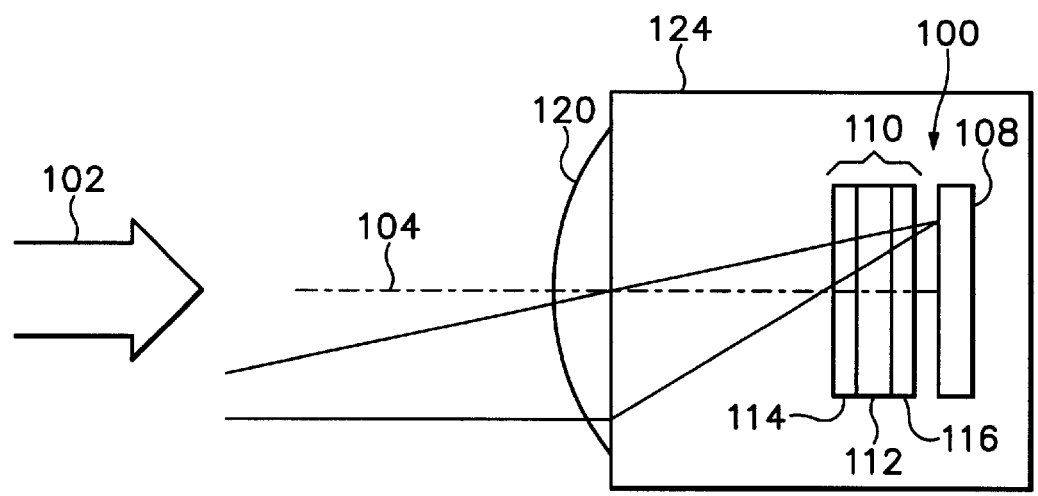
FIG. 2 is a diagram of a camera made according to the invention.

A first embodiment is now described with reference to FIG. 2. Camera 100 is for producing an output indicative of the intensity distribution of a light beam 102 propagating along an optical path 104. The intensity distribution or profile is measured by measuring the intensities of portions of the beam and then recombining them. The camera includes a detector array 108 such as a CCD array. The array is placed in path 104 such that at least some of the detectors receive portions of beam 102.

Each detector, also known as sensor, outputs an individual detection signal that is also called a raw voltage. The detection signal is descriptive of an intensity of the portion of the beam it receives. It is an important feature of the invention that the sensor need not produce a digitally denominated voltage. The invention works equally fundamentally by the sensor producing analog voltages. Even though the present description is primarily with voltages denominated with digital values, such is by way of example and not of limitation.

Figure 4:
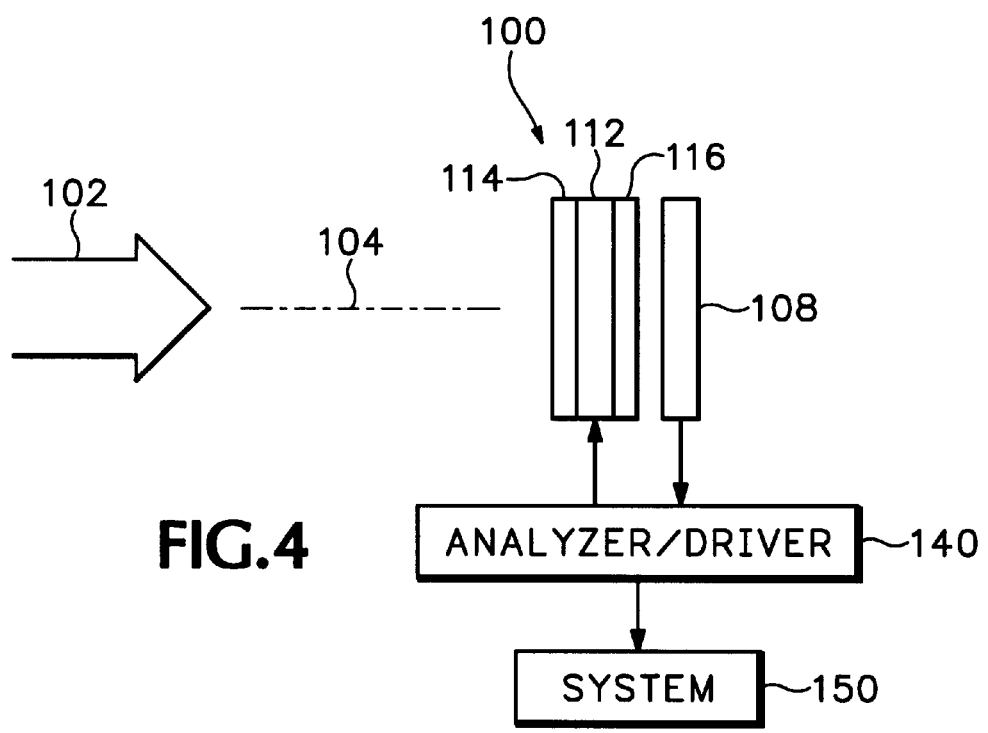
FIG. 4 is a diagram of components of a camera made according to the invention.

The camera further includes an optical filter 110, that is placed in path 104 before the beam reaches array 108. The filter is preferably placed adjacent the array for best results, although that is not required. In FIGS. 2 and 4 it is shown somewhat detached for clarity only.

The filter includes spatial sections of individually adjustable optical density. Preferably the filter is made from a liquid crystal light valve (LCLV) 112, that is placed between a polarizer 114 and an analyzer 116. In that case, each section of the filter is a general grouping of pixels of the LCLV. In the ideal case, the grouping contains just one pixel as is described below with reference to FIG. 3.

As such, the detector array receives light after it has gone through the filter. Whether the optical density of a filter section is increased, the intensity of light reaching the corresponding detector is accordingly decreased.

The camera preferably also includes an objective lens 120. Lens 120 defines a focal plane, where the detector array is placed.

The invention also provides a stand alone camera unit. In that case, the camera of the invention is also provided with a housing 124.

The detector array receives the light after it has passed through the filter. If the light is too bright at a specific location, the corresponding detector(s) will be saturated, and the resulting detection signal(s) ($I_D$) will be the maximum of the range ($I_{DMAX}$).

The filter receives control signals, for adjusting the optical density of its individual sections. When a detection signal $I_D$ at a detector equals the maximum ($I_{DMAX}$), the optical density of the corresponding section of the filter starts increasing, and thus the intensity of the light reaching the detector starts decreasing. This continues until a predefined condition is met, as is described in more detail below in the method of the invention.

Figure 3:
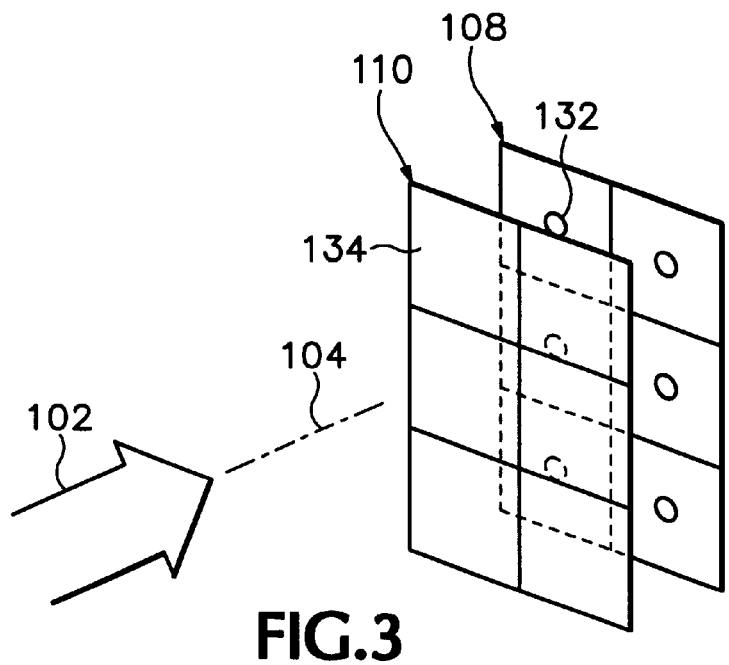
FIG. 3 is a diagram illustrating a one to one correspondence of the sections of the filter with the detectors of the array of the camera of FIG. 2.

An advantage of the present invention is now made obvious with FIG. 3. In FIG. 3 only detector array 108 and filter 110 are shown as planes, and at some distance from each other. Since the filter is actually placed very near the array, or even adjacent to it, the sections of the filter can be made to correspond to the detectors one by one. In other words, one section 134 of the filter can correspond to very few, or just one individual detector 132 there. This also requires careful alignment, and results in very fine picture control, and thus high resolution.

While FIG. 3 shows only 6 pixels (3 rows of 2), such is done for clarity and is not indicative of a limitation. An ideal application is an LCLV that includes a transmission LCD panel with a rectangular array of elements, also known as pixels. Good resolution is given by an array with 1024×1024 pixels, and with a matching detector array.

The components of the camera of the invention are now described with reference to FIG. 4. In FIG. 4 the optional objective lens and housing of FIG. 2 are not shown.

The detection signals of array 108 are received by an analyzer/driver 140. For each section of the filter, the analyzer creates a control signal that is sent to filter 110. The control signal is created according to one of the various methods of the invention that are described below.

Figure 5:
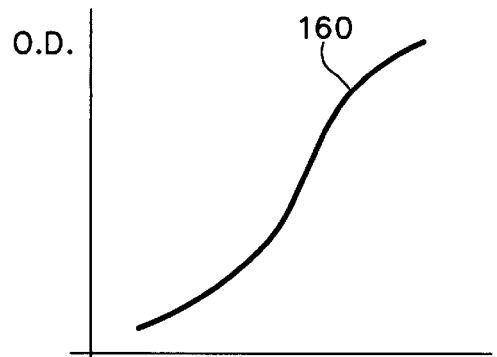
FIG. 5 is a graph of the transfer function of a LCD transmission element.

FIG. 5 shows a sample transfer function of a typical LCD element. Its exact shape does not matter, as long as it is known. It will be obvious to a person skilled in the art that this graph can be adjusted by suitable design of the LCD elements of the array.

Referring to the graph of FIG. 5, if the filter is made with a LCLV, each control signal Vf must be generated also by taking into account this graph. Desired optical density (O.D.) values are determined by the method of the invention, as will be understood from the below. These values generate, from the graph, appropriate values of the required finalized control signals Vf. These values can be stored as a look up table in analyzer/driver 140.

Returning to FIG. 4, the analyzer additionally creates a composite signal as an aggregate of the detection signal and of the control signal, before the latter is finalized by the look up table of FIG. 5. The composite signals are output to the rest of the system 150.

In the event that there is the above described one to one correspondence, as is preferred, each detection signal is used to produce the control signal of the filter section that corresponds to it. Then the composite control signals are also called scaled voltages.

In an alternative embodiment, an LCD panel is used in connection with groups of multiple sensors. Each group contains sensors sensitive to a particular band of wavelengths. This means that the sensors belong in subsets of different response characteristics to the same band of wavelengths. The panels are controlled independently, to produce color specific effects.

All of the above described embodiments can be augmented by including additional LCD panels, and controlling them in concert. Transmission LCD panels have response times of tens of milliseconds. This provides for real time density adjustment, with simultaneous control of spatial and temporal dimensions. The ability to fine tune the density of filtration over the extent of the filter provides for a simple implementation of special effects.

A transmission LCD uses little power, is compact and simple, and is robust and trouble free. Such a device can be built in to a camera system and be maintenance free for the life of the camera. Alternatively the filter can be configured as an add-on to existing systems, with a separate detector/control system.

General Method

Figure 6:
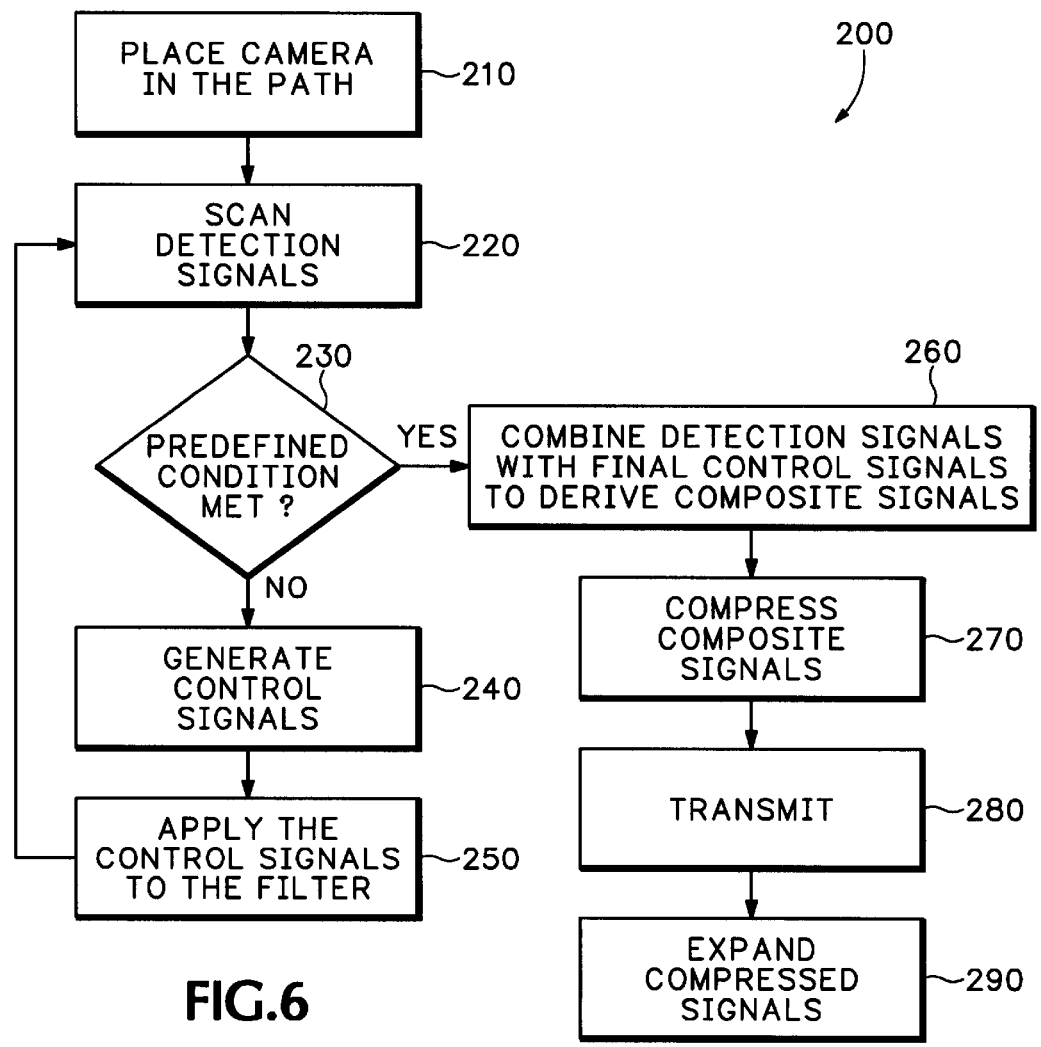
FIG. 6 is a flowchart illustrating steps of a general method of the invention.

A general method of the invention is now described with reference to FIG. 6. The method is for producing signals indicative of an intensity distribution of a light beam propagating along an optical path. FIG. 6 shows a flowchart 200 that outlines the steps.

According to a step 210, the above described camera of the invention is placed in the path of the beam such that such that at least some detectors receive portions of the light beam through the corresponding sections of the filter. Then the illuminated detectors will output individual detection signals.

According to a step 220, the detection signals are scanned.

According to a subsequent step 230, it is determined if a predefined filtering condition has been met. Various types of filtering conditions are possible, and are described below. As will be understood from the below, the nature of step 220 depends on the nature of the predefined filtering condition of step 230.

If the predefined filtering condition is not met, then control signals are generated (step 240) and applied to the filter (step 250) so as to adjust the optical density of its individual sections. This adjusting the intensity of the light reaching the detectors, which thereby adjusts the detection signals.

Then the detection signals are scanned again (step 220), to determine if the predefined condition has been met (step 230). If not, the control signals are adjusted again. The process continues iteratively until the condition is met.

The control signals can be generated by an independent user. Preferably, the control signals are generated as a feedback from the detection signals. This suits well the iterative process.

According to a step 260, when the condition has been met, the detection signals are combined with the control signals to derive composite signals. The composite signals correspond to the intensity of the portions of the light beam. It will be obvious that the combination is usually with suitable aspects of the control signal, and determined by the process.

According to a step 280, the composite signals are transmitted to the rest of the system. According to optional steps 270 and 290, the composite signals are first compressed for faster transmission, and then expanded after transmission. Compression and expanding (also known as companding), can be performed in a number of ways, depending on the desired result. For example, logarithmic techniques can be used, such as $\mu$-law or A-law.

Control Methods.

The invention also provides methods for controlling the optical density of the filter sections. These control methods are associated with steps 220, 230 and 240 of FIG. 6. The control methods are for better adapting aspects of the invention, such as readability of the scaled voltage, or best viewability of the final image.

In all control methods, since the filter works by obscuring, it can only help by imaging intensities higher than the window. As such, the dynamic range is maximized if the window of the detector is set at a low place on the intensity axis. So, in all cases, the optical density of at least one section of the filter will be increased. Increasing is typically until all detection signals are below $I_{DMAX}$.

In all cases, the image information becomes encoded in the composite signals. Depending on the method, the composite signal's content will include more or less of each of its two components (detection signal and control signal).

First Control Method.

In the first control method of the invention the optical density of the filter sections is increased until all detection signals are below $I_{DMAX}$. Increasing can be by skipping through a series of predetermined optical densities.

The first method of the invention is best suited for embodiments where the detection signal has a digitally denominated value, given by a number of bits. Then the optical densities can be represented by additional bits, for a direct addition to the detection signal for generating the scaled voltage.

A convenient example for illustrating this method is for where the signal takes values according to powers of two, although possibilities with other exponents will be evident to a person skilled in the art in view of the present description. Then accordingly there are selected optical density values of D1=½, D2=¼, D3=⅛ . . .

In that case, if the detection signal is given by eight bits, it takes values between 0 and 255. Then an ON/OFF voltage for D1 becomes the $9^{th}$ bit of the scaled voltage, an ON/OFF voltage for D2 becomes the $10^{th}$ bit, etc. The ON/OFF voltages are aspects of the control voltages, before being finalized by the graph of FIG. 5 for determining the final control voltage that drives the LCD element.

The strength of this method is that the ON/OFF voltages become directly part of the scaled voltage. According to it, each filter section becomes progressively darker (by powers of two), until its detection value falls between the window of the detector, i.e. between 0 and 255.

The resulting mapping is seen in FIG. 7. There in the horizontal axis is the absolute value of the intensity of the beam incident on the filter, and in the vertical axis is the detection value. A characteristic of this method is that, for intensities larger than $I_{DMAX}$, all detection values will be larger than 127 (which is half of $I_{DMAX}$, and we are using powers of two).

Another characteristic is that, for large intensities, the line has a reduced slope. As such, it loses contrast and is more susceptible to optical noise. This is another way of saying that, between the neighboring bits, a lot of information can be lost.

Second Control Method.

As an alternative, the variable density filter is controlled so as to produce a uniform level of illumination $I_K$ on the detectors. In that case, the optical density may also be decreased as part of the iteration of the general method.

The resulting mapping is seen in FIG. 8. The technique does not work for places where $I_D<I_K$. Still, the dominant component becomes the control signal, so much so that the detection signal may even be ignored. Moreover, the composite signal includes more bits of precision than a corresponding CCD output.

Image Processing Method.

A map is then generated by arranging the composite signals, which include at least the control signals, and preferably also the detection signals. The map reconstructs the intensity distribution of the beam.

Image processing techniques can then be applied to the map of the composite signals. Alternately, the techniques can be applied directly to a map of the control signals, if the detection signals will be ignored.

Taking into account the properties of the human visual system, the optimal method of setting the density of a single filter section is to compute a weighted sum of the received detection signal at each pixel in the neighborhood around the central sensor corresponding to the single filter section. Then adjust the optical density of the section to move that weighted sum towards an appropriate global average. A kernel for this mathematical process of convolution is shown in FIG. 9. The effect of such a weighting matrix would be to preserve local variations of light intensity (and thus visual detail), while reducing the intensity around bright spots in the image. This tends to match the performance of the human visual system, which is sensitive to local contrast variation.

A person skilled in the art will be able to practice the present invention in view of the present description, where numerous details have been set forth in order to provide a more thorough understanding of the invention. In other instances, well-known features have not been described in detail in order not to obscure unnecessarily the invention.

Having illustrated and described the principles of the invention in a preferred embodiment thereof, it should be readily apparent to those skilled in the art that the invention can be modified in arrangement and detail without departing from such principles. I claim all modifications coming within the spirit and scope of the accompanying claims.

The invention claimed is:

1. A camera for producing an output indicative of an intensity distribution of a light beam propagating along an optical path, comprising:

an array of optical detectors placed in the optical path such that at least some detectors receive portions of the light beam and thereby output individual detection signals, each detection signal indicative of an intensity of the portion of the light beam received by the detector that outputted the detection signal;

an analyzer/driver for receiving the detection signals and producing control signals, the analyzer further producing composite signals from the detection signals and the control signals, the composite signals thereby having a magnitude corresponding to the intensity of portions of the light beam; and a filter placed proximately to the array in the optical path before the array, the filter including spatial sections of individually adjustable optical density, the filter receiving the control signals for adjusting the optical density of the individual sections;

the analyzer/driver computing a weighted sum of the received detection signals in a neighborhood around a central detector corresponding to a single filter section and adjusting the optical density of the filter section to move the weighed sum toward a global average.

2. The camera of claim 1 wherein the analyzer/driver increases and decreases the optical density of the spatial sections of the filter until a corresponding composite signal is less than a predetermined value.

3. The camera of claim 1, wherein the filter comprises a LCLV.

4. The camera of claim 1, further comprising an objective lens defining a focal plane, and wherein the array is located at the focal plane.

5. The camera of claim 1, wherein a first subset of the detectors has a first response characteristic to light of a predetermined band of wavelengths, and wherein a second subset of the detectors has a second response characteristic to light of the predetermined band of wavelengths.

6. The camera of claim 5, wherein a single filter section corresponds to a grouping of detectors that includes at least one detector from the first subset and at least one detector from the second subset.

7. A method of producing signals indicative of an intensity distribution of a light beam propagating along an optical path, the method comprising the steps of:

placing in the path an array of optical detectors such that at least some detectors receive portions of the light beam and thereby output individual detection signals, each detection signal descriptive of an intensity of the portion of the light beam received by the detector that outputted the detection signal;

placing in the path proximately to the array a filter that includes spatial sections of individually adjustable optical density;

generating control signals and applying the control signals to the filter so as to adjust the optical density of the individual sections of the filter, thereby adjusting the intensity of the light reaching the detectors and thereby adjusting the detection signals until a predefined filtering condition is met;

computing a weighted sum of the detection signals in a neighborhood around a central detector corresponding to a selected filter section and adjusting the optical density of the selected filter section to move the weighed sum toward a global average; and combining the detection signals with the control signals to derive composite signals that correspond to the intensity of the portions of the light beam.

8. The method of claim 7 further comprising the steps of compressing the composite signals and expanding the compressed composite signals.

9. The method of claim 7, wherein the generating step is such that the optical density of at least one section of the filter is increased until all detection signals are below a predetermined maximum value.

10. The method of claim 9, wherein the generating step is such that the optical density of the section of the filter is increased monotonically until a corresponding composite signal is less than the predetermined maximum value.

11. The method of claim 10, wherein the optical density is increased to values belonging in a series of predetermined values.

12. A method of producing signals indicative of an intensity distribution of a light beam propagating along an optical path, the method comprising:

placing in the path an array of optical detectors such that at least some detectors receive portions of the light beam and thereby output individual detection signals, each detection signal descriptive of an intensity of the portion of the light beam received by the detector that outputted the detection signal;

placing in the path proximately to the array a filter that includes spatial sections of individually adjustable optical density;

generating control signals and applying the control signals to the filter so as to adjust the optical density of the individual sections of the filter, thereby adjusting the intensity of the light reaching the detectors and thereby adjusting the detection signals until a predefined filtering condition is met and at least one section of the filter is increased until all detection signals are below a predetermined maximum value;

increasing and decreasing the optical density of the section of the filter until a corresponding composite signal is less than the predetermined maximum value; and combining the detection signals with the control signals to derive composite signals that correspond to the intensity of the portions of the light beam.

13. A method of producing signals indicative of an intensity distribution of a light beam propagating along an optical path, the method comprising the steps of:

placing in the path an array of optical detectors such that at least some detectors receive portions of the light beam and thereby output individual detection signals, each detection signal descriptive of an intensity of the portion of the light beam received by the detector that outputted the detection signal;

placing in the path proximately to the array a filter that includes spatial sections of individually adjustable optical density;

generating control signals and applying the control signals to the filter so as to adjust the optical density of the individual sections of the filter, thereby adjusting the intensity of the light reaching the detectors and thereby adjusting the detection signals until a predefined filtering condition is met;

combining the detection signals with the control signals to derive composite signals that correspond to the intensity of the portions of the light beam; and generating a map at least from the control signals and convolving the map with a predetermined kernel.

* * * * *